United States Patent [19]

Whyte

[11] Patent Number: 5,404,613
[45] Date of Patent: Apr. 11, 1995

[54] RAPID DEPLOYMENT APPARATUS RECOVERING OIL FROM BEACHES

[76] Inventor: Gary R. Whyte, P.O. Box 509, Aurora, Oreg. 97002

[21] Appl. No.: 132,655

[22] Filed: Oct. 6, 1993

Related U.S. Application Data

[62] Division of Ser. No. 864,869, Apr. 7, 1992, Pat. No. 5,302,210.

[51] Int. Cl.$^6$ ............................................. A47L 7/00
[52] U.S. Cl. ..................................... 15/320; 15/322; 15/353; 15/340.1
[58] Field of Search .................... 15/320, 353, 322

[56] References Cited

U.S. PATENT DOCUMENTS

| | | |
|---|---|---|
| 1,296,868 | 3/1919 | Smith . |
| 1,601,774 | 10/1926 | Scheffer . |
| 2,906,402 | 9/1959 | Blankevoort . |
| 2,926,961 | 3/1960 | Diebold . |
| 3,035,695 | 5/1962 | Buchwald . |
| 3,190,451 | 6/1965 | Holland . |
| 3,337,889 | 8/1967 | West . |
| 3,447,188 | 6/1969 | Maasberg ............... 15/320 |
| 3,859,163 | 1/1975 | Haythornthwaite . |
| 3,868,739 | 3/1975 | Hargrave . |
| 3,939,527 | 2/1976 | Jones ..................... 15/320 X |
| 3,942,214 | 3/1976 | Maasberg ............... 15/320 |
| 3,969,834 | 7/1976 | Geier et al. . |
| 4,023,323 | 5/1977 | Prestwich ............... 15/320 |
| 4,037,335 | 7/1977 | Sandberg . |
| 4,083,134 | 4/1978 | Oterdoom . |
| 4,114,229 | 9/1978 | Jones et al. ............. 15/320 |
| 4,132,010 | 1/1979 | Deland . |
| 4,139,463 | 2/1979 | Murphy et al. . |
| 4,157,016 | 6/1979 | Wendt et al. . |
| 4,168,562 | 9/1979 | Maasberg . |
| 4,194,978 | 3/1980 | Crema . |
| 4,285,815 | 8/1981 | Gallottini . |
| 4,302,339 | 11/1981 | Cloutier . |
| 4,350,591 | 9/1982 | Lee . |
| 4,401,475 | 8/1983 | Eriksson et al. . |
| 4,410,426 | 10/1983 | Cloutier . |
| 4,462,137 | 7/1984 | Berfield et al. ......... 15/320 X |
| 4,492,001 | 1/1985 | Hendrenius . |
| 4,575,426 | 3/1986 | Littlejohn et al. . |
| 4,769,142 | 9/1988 | Withnall . |
| 4,840,729 | 6/1989 | Levine . |
| 4,852,211 | 8/1989 | Strausak . |
| 5,033,159 | 7/1991 | Whilden et al. ......... 15/422 X |
| 5,076,919 | 12/1991 | Francisco, Jr. . |

FOREIGN PATENT DOCUMENTS

| | | |
|---|---|---|
| 2559806 | 2/1984 | France . |
| 485963 | 10/1926 | Germany . |
| 8103793 | 8/1981 | Netherlands . |

*Primary Examiner*—Christopher K. Moore

[57] ABSTRACT

A rapid deployment system for recovering oil from beaches includes an articulated vehicle for propelling and suspending a vacuum head above a beach or the like. A selected area of the beach is irrigated with sufficient quantities of water to saturate the selected area. Oil deposited on the beach is driven to the surface. A sufficient quantity and velocity of air moves over the surface beneath the vacuum head to develop a water column upon which resides a frothy foam mixture of air, water and oil which is drawn into the head. In the vacuum head, the velocity of the air flow is suddenly and significantly reduced above a fluid sump wherein entrained oil and water droplets fall into a sump for processing outside of the vacuum head. A metal auger can be provided within the vacuum head to pump oil from pools and separate entrained oil droplets from the high velocity air flow. A special terrain vehicle which propels and supports the vacuum head is modular and can be transported by helicopter with the entire system.

12 Claims, 7 Drawing Sheets

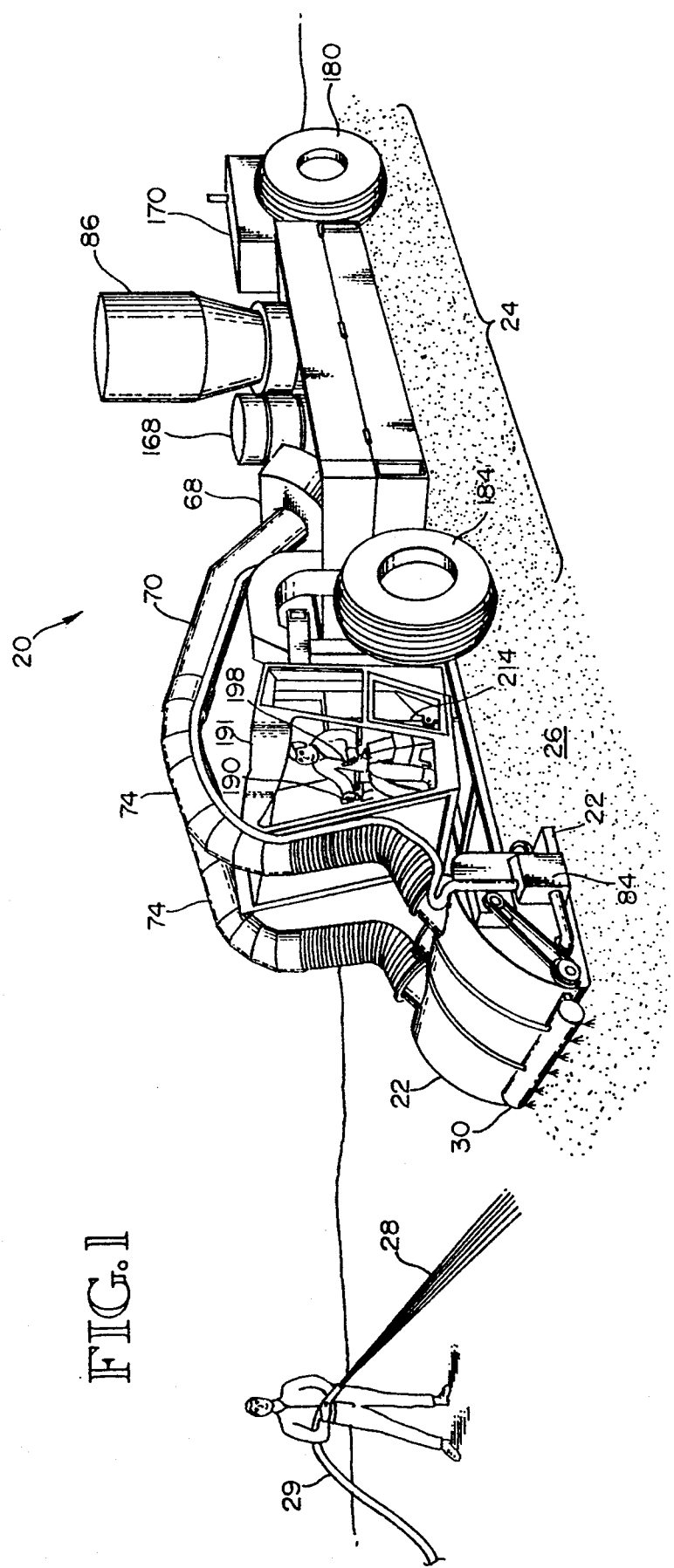

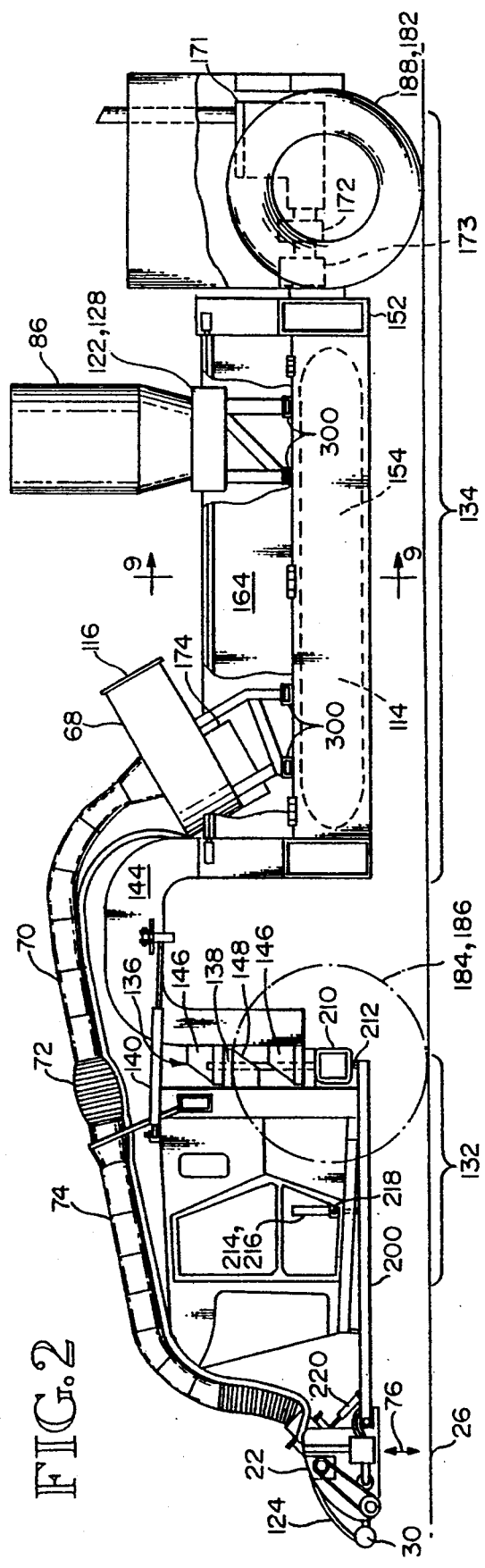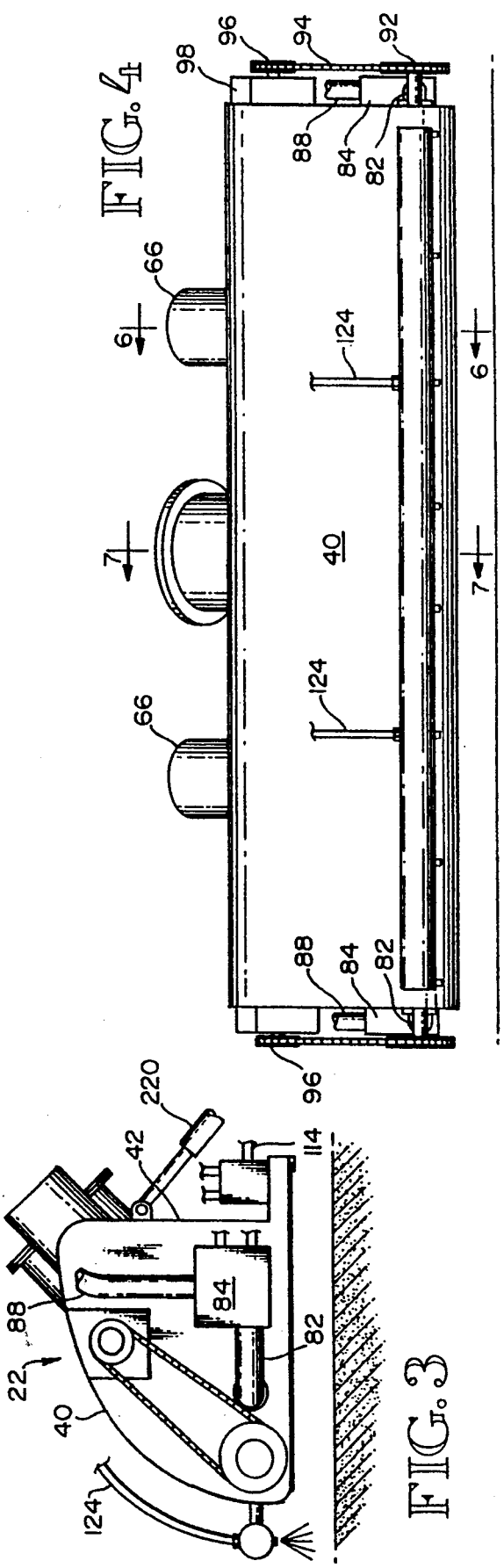

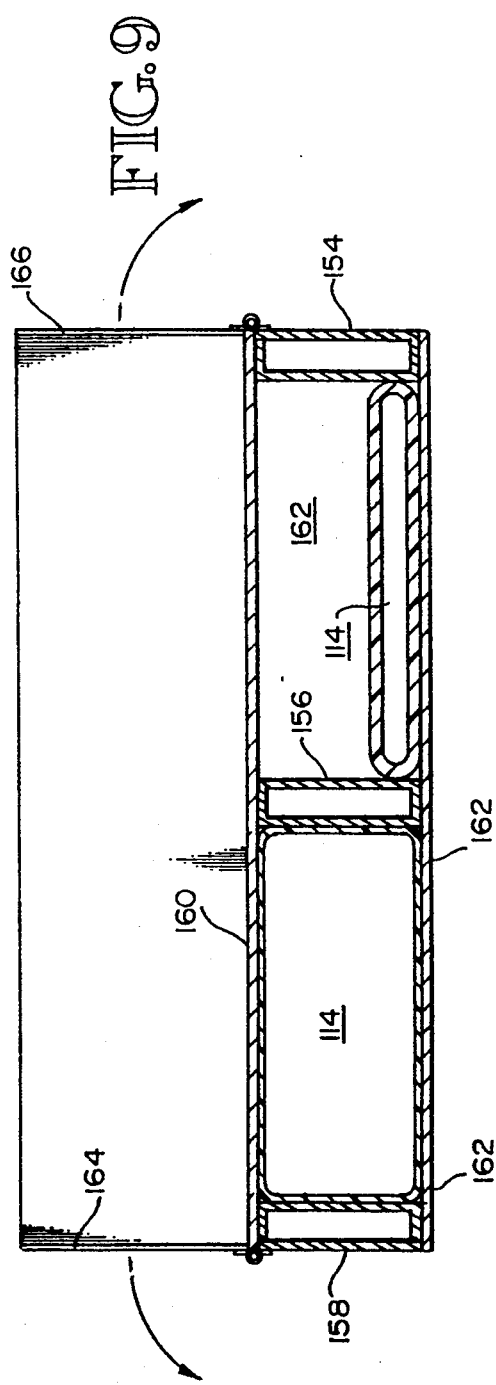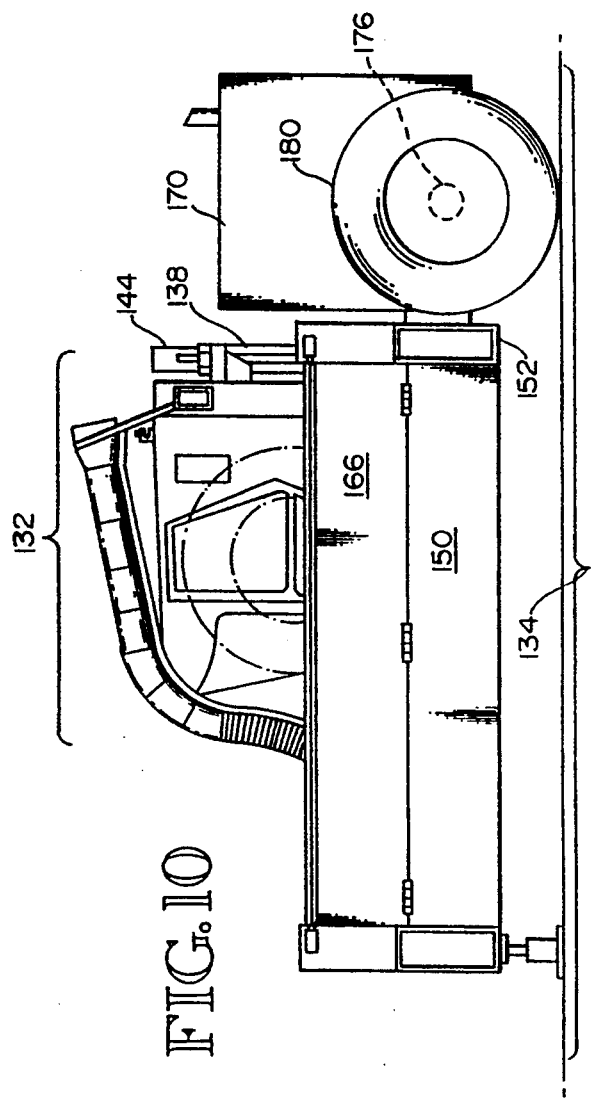

RAPID DEPLOYMENT APPARATUS RECOVERING OIL FROM BEACHES

RELATED APPLICATIONS

This application is a divisional of U.S. patent application Ser. No. 07/864,869, filed Apr. 7, 1992, now U.S. Pat. No. 5,302,210, issued Apr. 12, 1994, and titled "Rapid Deployment Method for Recovering Oil From Beaches".

TECHNICAL FIELD

The invention relates to methods and apparatus for recovering fluid contaminants from a particulate medium. More specifically, the invention relates to methods and apparatus for recovering oil spills from beaches before volatiles have evaporated from the oil creating a material having a density significantly greater than water.

BACKGROUND OF THE INVENTION

Large quantities of oil are presently transported from oil-producing regions to oil-consuming regions by various means, including large sea-going vessels. As the number and size of such vessels increases, the probability of a large oil spill occurring, with its attendant, serious environmental consequences also increases. A number of such accidents have occurred which have resulted in contamination of beaches with possibly permanent environmental damage.

Substantial progress has been made in the recovery of oil spilled on large bodies of water. Typically, the oil spill is surrounded by a floating boom to contain the spill. Conventional vacuuming and filtering equipment are then employed to remove the oil from the circumscribed area, as the oil will continue to float on the surface of the water as long as the more volatile components of the oil have not evaporated. Such efforts have proven effective as long as the oil remains at sea, the booms are quickly deployed, and the sea is not too rough.

Recovering oil from beaches is substantially more difficult than recovering oil from the sea. The beach environment contains a large number of organisms which live on the beach, and below the surface of the beach to a depth of approximately one foot. In contrast, the upper layer of the ocean is a relatively "dead" ecological environment. Therefore, oil spills which have washed up on beaches generally cause significantly greater ecological damage than oil spills which are contained at sea.

Unfortunately, no currently known technologies have been successful in recovering oil directly from beaches in an ecologically acceptable manner. Presently, the most effective method of cleaning oil contaminated beaches is to wash the spilled oil back into the ocean so that the boom and vacuum method described above can be employed. This technique is only successful if the oil spill is fresh (i.e., the volatiles have not evaporated). If the oil has begun to evaporate, the beach deposit becomes a heavy sludge which can only be washed off with steam or extremely hot water at high pressure. This combination destroys the beach and is injurious to the organisms which live on and under the beach.

The above-described technique of washing spilled oil back into the ocean is generally accomplished with high pressure hoses. This technique in itself has been recognized as being ecologically harmful in U.S. Pat. No. 4,410,426 to Cloutier. Cloutier describes a device which locally floods a selected area of a beach to suspend spilled oil in a slick above the sand. A conventional skimming device then removes the oil slick. Cloutier's technique requires prodigious amounts of water, heavy equipment, and substantial setup time and therefore is not amenable to rapid deployment to locations distant from industrialized areas where oil spills often occur. Without such rapid deployment capability, the oil spill is likely to viscosify before the equipment arrives rendering Cloutier's technique unusable.

In view of the above, a need exists for a self-contained, rapidly deployable system which can effectively remove oil deposited on a beach, including the surface beneath the beach, without substantially disturbing the physical structure of the beach or killing the organisms which reside thereunder.

SUMMARY OF THE INVENTION

It is an object of the present invention to provide an apparatus which effectively removes and processes oil from a particulate media, such as a beach, without substantially disturbing the structure of the media.

It is also an object of the present invention to achieve the above object with an apparatus which is entirely self-contained, and readily transportable to distant locations.

It is yet another object of the invention to achieve the above two objects with an apparatus having a minimal physical impact on the beach to preserve the structure of the beach and the organisms residing thereunder.

These objects, and other objects and advantages of the invention which will become apparent from the description which follows, are achieved by providing a method and apparatus for decontaminating a particulate media which has been contaminated with a fluid contaminant having a density less than water such as petroleum. The invention relies on providing or encountering a beach saturated with water, and directing a high velocity air flow across and substantially normal to the surface of the beach. This reduces the local atmospheric pressure and creates a standing column of water so as to develop a frothy head of air, water and fluid contaminant above the water column and beneath a vacuum head. On entering the vacuum head, the high velocity air flow entrains droplets of water and the fluid contaminant. Once inside the vacuum head, the velocity of the air flow is substantially reduced below a critical velocity so that droplets of the water and fluid contaminants fall into a fluid sump and coalesce into a fluid mixture. The fluid mixture is then removed from the sump for processing outside of the vacuum head in another section of the invention. In this manner, the vacuum head is the only portion of the system which requires sufficiently rigid and heavy construction to withstand partial vacuum.

In a preferred embodiment of the invention, the vacuum head is suspended over the beach by a self-propelled vehicle which contains a prime mover for propelling the head, generating a partial vacuum within the head, and processing the fluid mixture withdrawn from the head. The vehicle is entirely self-contained and provides storage for oil recovered from the beach, and an initial supply of water for irrigating the beach. During processing, the fluid mixture is substantially separated into recovered oil and relatively pure water. This relatively pure water can be fed back to the vacuum head for irrigation of a selected area of the beach adjacent to the vacuum head. The recovered oil can be stored on board, or off loaded to a storage facility, transport trucks, barges, etc.

The effectiveness of the system in creating the frothy mixture of air, oil and water from a saturated beach can be controlled by adjusting a variety of parameters including: The height of the vacuum head above the beach; the speed of a fan which generates the high velocity air flow through the vacuum head; the amount, if any, of air exhausted from the fan which is directed back into the vacuum head to reduce the partial vacuum therein; the size of apertures defining an inlet for the vacuum head; the speed of the vehicle over the surface of the beach; the addition of detergents and/or emulsifiers to the irrigation water, etc.

In another preferred embodiment of the invention, a metal auger is provided at the leading edge of the vacuum head. The auger is oleophilic and therefore causes oil droplets entrained in the high velocity air flow (but substantially not water droplets) to adhere thereto. When rotated, the auger drives these oil droplets to an oil conduit for deposition into a recovered oil reservoir, for off loading from the system. In an alternate embodiment of the invention, the auger is not employed.

BRIEF DESCRIPTION OF THE DRAWINGS

FIG. 1 is an environmental, isometric view of a rapid deployment system for recovering oil from beaches and the like in accordance with the present invention.

FIG. 2 is a side elevational of the system shown in FIG. 1.

FIG. 3 is a side elevational view of a vacuum head used in conjunction with this system.

FIG. 4 is a front elevational view of the vacuum head shown in FIG. 3.

FIG. 9 is a sectional, elevational view taken along lines 9—9 of FIG. 2.

FIG. 10 is a side elevational view of the system of FIG. 1 in a nested configuration.

BEST MODE FOR CARRYING OUT THE INVENTION

Figure 5:
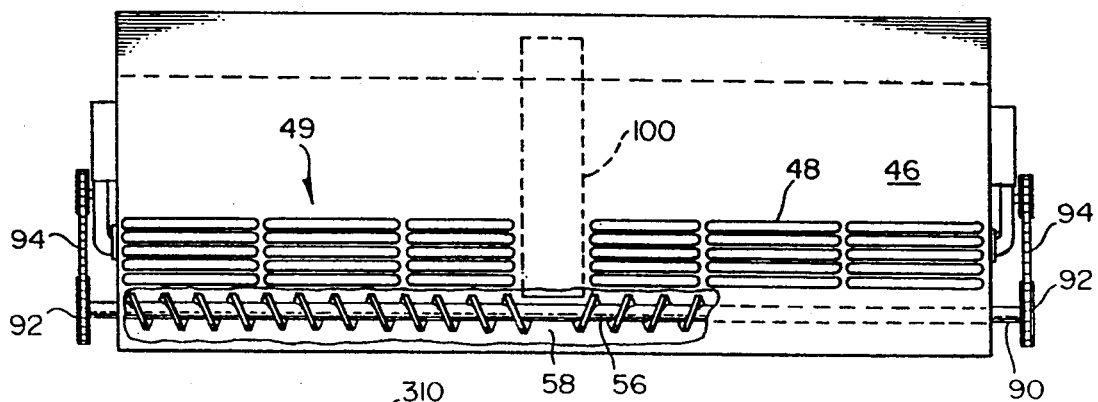
FIG. 5 is a bottom plan view of the vacuum head.

A rapid deployment system for recovering oil spills from beaches and the like and in accordance with the principles of the present invention is generally indicated at reference numeral 20 in FIG. 1. The system is designed for rapid deployment to distant locations while the oil spill is still fresh (i.e., before volatiles have evaporated producing a heavy sludge which is difficult to remove in an environmentally sound manner). The system is capable of independent operation, without refueling for periods of up to twelve hours, and can store up to 600 gallons of recovered oil without unloading.

The system employs a vacuum head 22 which is supported, propelled, suspended and powered by a special terrain vehicle 24.

The system is less than 34 feet long, 7½ feet wide, and 9 feet tall and thus can drive directly on board a C-130 fixed wing aircraft or slung beneath a Chinook helicopter. In addition, the system is modular with no single component weighing more than 6,000 pounds so as to be receivable in standard shipping containers.

Figure 6:
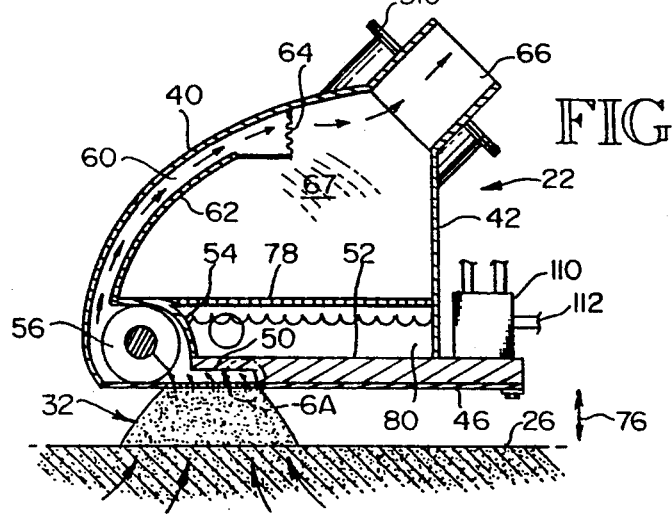
FIG. 6 is a sectional, elevational view taken along lines 6—6 of FIG. 4.

The system 22 employs a method in which a high velocity of air flow travels across and substantially normal to a beach surface 26 while the beach is in a substantially water saturated condition. The beach may be naturally in such a state, or, a saturated state can be induced with a crew pouring water 28 from hoses 29 and/or from an onboard irrigation system 30. The high velocity air flow is directed up and into the vacuum head 22 which, under the desired conditions generates a column of water upon which resides a frothy, aerated mixture of water and oil generally indicated at reference numeral 32 in FIG. 6. This mixture has been described as a "head of foam", a "sheet of water" and "a birthday cake". The foam is primarily air, but also contains a substantial amount of water and oil in a ratio of approximately ten to one.

The mixture enters the vacuum head 22 at a velocity of approximately 60 ft./sec. This velocity is sufficiently high to entrain oil and air droplets in the air flow. This air flow velocity is maintained or accelerated until the droplets reach a position within the vacuum head where the air flow velocity is dramatically reduced, causing the force of gravity to overcome the upward frictional force on the droplets provided by the air flow. These droplets then fall into a sump within the head for removal and processing outside of the head in equipment under substantially atmospheric pressure. The resulting air flow, which is substantially clean, is then exhausted from the head and into the atmosphere.

As a result of this technique, the vacuum head is the only principal component of the system 22 which is operating with pressure substantially different from atmospheric. The rest of the system can therefore be constructed of relatively lightweight materials to facilitate transportation of the system to distant locations and for rapid deployment of the system. Such rapid deployment and transportability is significant because the system operates most effectively on oil spills and beaches in which the volatile components of the oil have not evaporated to the point where the contaminant has a density substantially less than water and therefore does not "foam up" as well as less dense oil. The system can be used effectively with higher density deposits by providing ecologically acceptable detergents, emulsifiers, and/or enzymes in the on-board irrigation system 30, or external water hose 29.

As best seen in FIGS. 3, 4 and 5, the vacuum head 22 comprises a curvilinear forward wall 40, a substantially upright, rearward wall 42 and a bottom plate 46. Along with end walls 48, these surfaces define an enclosed volume. The bottom plate 46 defines three columns of apertures 48 generally defining a fluid inlet 49 having a cross-sectional area of approximately 450 in$^2$. The vacuum head is approximately 7 feet wide as seen in FIG. 4, and approximately 24 inches high and 24 inches deep.

The fluid inlet 49 enters an inlet chamber 50 defined by a sump floor 52 and a semi-cylindrical auger wall 54. The auger wall encloses an elongated metal auger 56 having right-hand directed and left-hand directed screw sections meeting at a central area 58 best seen in FIG. 5. The upper surface of the auger is in fluid communication with a high speed plenum or chimney 60 formed by a curvilinear inner wall 62 spaced at a distance of approximately 2 inches from the forward wall 40 and rising in a substantially parallel fashion approximately ¾ of the way up the forward wall. The inner wall terminates at a plenum outlet 64 in a spaced relationship from dual, cylindrical air outlets 66 having a diameter of approximately 12 inches, and therefore a combined cross-sectional area of approximately 450 in$^2$.

The plenum outlet 64 has a cross-sectional area of approximately 250 in$_2$, while the area adjacent the plenum outlet (i.e., between the plenum outlet 64 and the air outlet 66) is approximately 1600 in$^2$. As a result of this geometry, air flow entering the inlet through apertures 48 accelerates around the auger 56 reaching a maximum speed within the plenum 60. On exiting the plenum outlet 64, the air flow velocity drops dramatically. The air flow becomes somewhat turbulent in this region (which can be termed a "precipitation" chamber 67) which includes the interior volume of the vacuum head. The air flow then accelerates to approximately the speed of the air flow at the inlet 49 as it approaches the air outlet 66.

The air flow is generated by a hydraulically driven fan 68 as best seen in FIG. 2, which is in fluid communication with the air outlet 66 through a main conduit 70, a flexible member 72 and a pair of parallel conduits 74. A suitable fan is model No. AO-30S manufactured by Fan Engineering, Los Angeles, Calif. This fan is capable of generating 14,000 ft./min. at 20 inches of water column. It has been found that when employed as described above and shown in the drawings, the fan and vacuum will generate the desired frothy head of air, water and oil 32 shown in FIG. 6 if: The beach 26 is adequately saturated with water; if the fan is operated at approximately 10,000 cfm; and the head is suspended above the beach at a preferred height 76 of approximately 4–6 inches. If the beach is extremely smooth allowing a lower, preferred height of approximately one inch, then the fan output can be reduced appropriately. Conversely, if the beach if extremely rocky, the head may be elevated to a height of approximately 10 inches if the fan output is increased to its rated maximum.

Under the above conditions, the air flow entering the apertures 48 defining the fluid inlet 49 will have a velocity of approximately 60 ft./sec. This has been empirically determined as the preferred, minimum velocity to effectively retain air and water droplets in the air flow. Upon circumnavigating the auger 56, the air flow will reach a maximum velocity within the plenum 60 of approximately 150 ft./sec. Upon exiting the plenum outlet 64 and entering the precipitation chamber 58, the air flow velocity at some points approaches zero and is generally substantially below 60 ft./sec. The air and water droplets therefore fall through a screen 78 and into a sump 80 in which the droplets coalesce into a fluid mixture. This mixture is removed from the head 22 through fluid outlets 82 and the side walls 47 by way of conventional, hydraulically driven pumps 84. Suitable pumps can be purchased from Discflo Corporation, Santee, Calif. The fluid mixture output of hydraulic pumps 84 is transferred to a cyclonic oil/water separator 86 available from Guzzler Mfg., Birmingham, Ala. by way of fluid mixture conduits 88. The oil separator 86, and the fan 68 are driven by conventional hydraulic motors available from Discflo Corporation.

The auger 56 has two complimentary functions with respect to operation of this system 20. Primarily, the oleophilic character of the material (steel) from which the auger is made serves to attract and retain oil droplets (but substantially not water droplets) entrained in the high speed air flow within the vacuum head. The auger is fixed for rotation on an axle 90 which is journaled at both ends to sprockets 92. The sprockets engage chains 94 (see FIG. 5) which are driven by drive sprockets 96. The drive sprockets are driven by conventional hydraulic motors 98 so that the auger is rotatable from a standstill to approximately 100 rpm.

When rotated under the conditions described above, the auger drives the separated oil droplets towards the central area 58 whereupon the oil coalesces into a fluid mass and is forced into oil conduit 100 for receipt by oil output pump 110. The oil output pump 110 is identical to the variable speed, hydraulic pumps 84 and off loads the relatively pure oil recovered by the auger through an oil hose 114 directly to twin oil storage bladders 112 residing within special terrain vehicle 24 (see FIG. 9).

Figure 11:
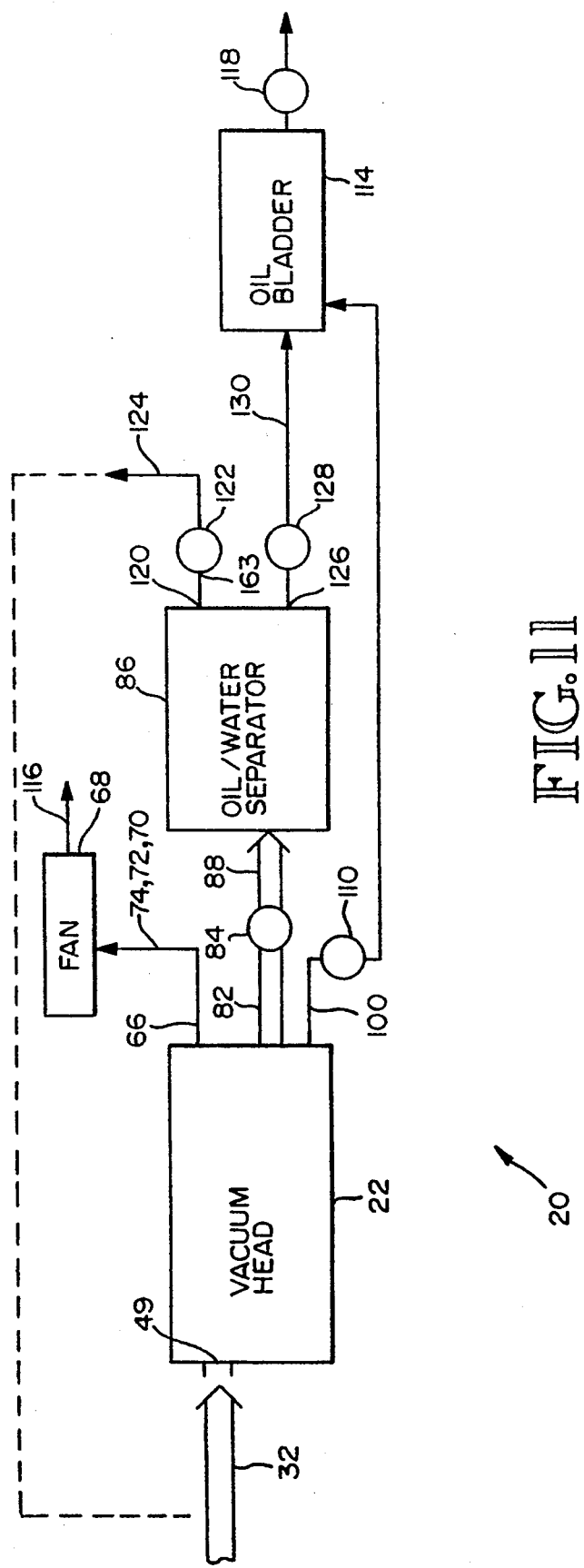
FIG. 11 is a simplified, fluid flow diagram illustrating the principles of the present invention.

A simplified diagram of fluid flow through the system 20 is schematically illustrated in FIG. 11. The frothy mixture of oil, water and air 32 enters the vacuum head 22 through the fluid inlet 49. Within the vacuum head, relatively oil-free air exits the air outlets 66 and passes through conduits 74, 72 and 70 to the fan 68 where the air is exhausted to the atmosphere through a fan exhaust 116. Oil droplets which are captured by the auger 56 are coalesced and driven through oil conduit 100 to oil pump 110. This relatively pure oil is then transferred through oil hose 112 to oil bladders 114. An oil off load pump 118 can be provided to continuously or intermittently empty the oil bladders 114. The oil droplets which are not captured by the rotating auger 56 continue their passage through the high speed plenum 60 and through plenum outlet 64 where they encounter a substantial reduction in velocity below the critical value. The frictional force of the air flow on the droplets is overcome by the force of gravity. The droplets fall into the sump 80 where they coalesce into a fluid mixture of oil and water. The fluid mixture is removed from the sump through fluid outlets 82 by hydraulic pumps 84 for introduction into the oil/water separator 86 by way of fluid mixture conduits 88.

The oil/water separator 86 is approximately 90 to 95% efficient and produces relatively pure water at a water outlet 120 for input to a water pump 122 to off load the water from the special terrain vehicle or for feedback through irrigation conduits 124 to the onboard irrigation system 30. The oil/water separator 86 also produces relatively pure oil at an oil outlet 126 for input to an oil pump 128 similar to water pump 122. The oil pump 128 passes the relatively pure oil which has been recovered from the beach through oil hoses 130 into the oil bladders 114.

It is important to note that in this system, the liquid uptake step and the air/fluid mixture separation step are the only steps requiring the use of a significant partial vacuum. This function is performed in a dedicated vacuum head 22 while the oil/water separation step occurs in a dedicated oil/water separator 86 which is physically distinct from the vacuum head 22. The vacuum head can be relatively small, and therefore lightweight. The oil/water separator operates at substantially atmospheric pressure and therefore can also be lightweight. As a result, the entire system 22 can be relatively lightweight, compact and modular which facilitates transportation of the system. A relatively, compact, high flotation vehicle for transporting the components is provided so as to minimize the physical impact on the beach. These two attributes, rapid deployability and low environmental impact, are critical in containing fresh oil spills and rehabilitating beaches therefrom.

As best seen in FIGS. 1 and 2, the special terrain vehicle 24 includes a cab section 132 for supporting the vacuum head 22 and for housing an operator 133. The cab section is connected to a pallet section 134 by a hinge mechanism 136 articulated about a vertical axis defined by a pin 138. This hinge is substantially similar to conventional articulated connections found in earth moving equipment. Double acting, hydraulic rams 140 and 142 (see FIGS. 2, 13) control the relative angular position of the cab section with respect to the pallet section to steer the vehicle. The pallet section has a U-shaped goose neck 144 at its forward end. A head section of the goose neck has forwardly extending tongues 146 which form the mortise of the hinge 136. The rear of the cab section 132 has a corresponding, rearwardly extending tongue 148 which forms the tenon of the hinge.

The aft end of the goose neck 144 is connected, such as by welding, to a transverse box beam 150. A corresponding, transverse rear box beam 152 along with three longitudinal, parallel and spaced apart box beams 154, 156 and 158 having their ends welded to the transverse box beams form a bed for the pallet section. Floor plates 160 and bottom plates 162 are welded to the upper and lower sides of the longitudinal beams to form enclosures 162 for the oil bladders 114 (see FIG. 9). The inner sides of the enclosures are sealed so as to provide watertight compartments. Each bladder 114 holds a maximum of approximately 300 gallons of fluid and are preferably of Hypalon ® brand material. It should be noted that when the system 22 arrives at a beach, the bladders 114 are empty as shown on the right-hand side of FIG. 9. The empty space above the bladders can be filled with water for use in the irrigation system 30 by providing fluid conduits from the enclosures 162 to the inlet side 163 of water pump 122 on the oil/water separator 120 (see FIG. 11). Pallet section 134 is also provided with side gates 164, 166 which are pivotally connected to the upper edges of transverse beams 158, 154, respectively. By dropping these gates, the fan 68 and oil/water separator 86 can be lifted and removed from the pallet section 134 by a conventional forklift. The pallet section can also provide additional storage for barrels 168 as shown in FIG. 1 for containing excessive recovered oil, additional water and/or detergents, emulsifiers, enzymes, etc. for use in the irrigation system 30, or fuel.

The pallet section also has at its rearward end an engine compartment 170 which contains and supports a conventional diesel engine 171. A suitable engine is a 225 hp. engine produced by John Deere Company, Moline, Ill. The engine compartment also contains two main 4.6 cu.in. hydrostatic pumps 172, 173 (electrically controlled for displacement) mechanically connected in parallel to the engine. Suitable pumps are model No. 46 available from Eaton Corporation, Eden Prairie, Minn. The first pump is used to power the hydraulic motor 174 on the fan 68. The second main hydraulic pump is used to drive four radial piston motors 176 (see FIG. 13), Model No. 405-160 manufactured by Valmet, Helsinki, Finland. Two motors are mounted outboard of the engine compartment 170 on a transverse axis for independently driving rear wheels 180, 182. The remaining two motors are positioned on opposite sides of the cab section 132 along a transverse axis for driving front wheels 184, 186.

Figure 13:
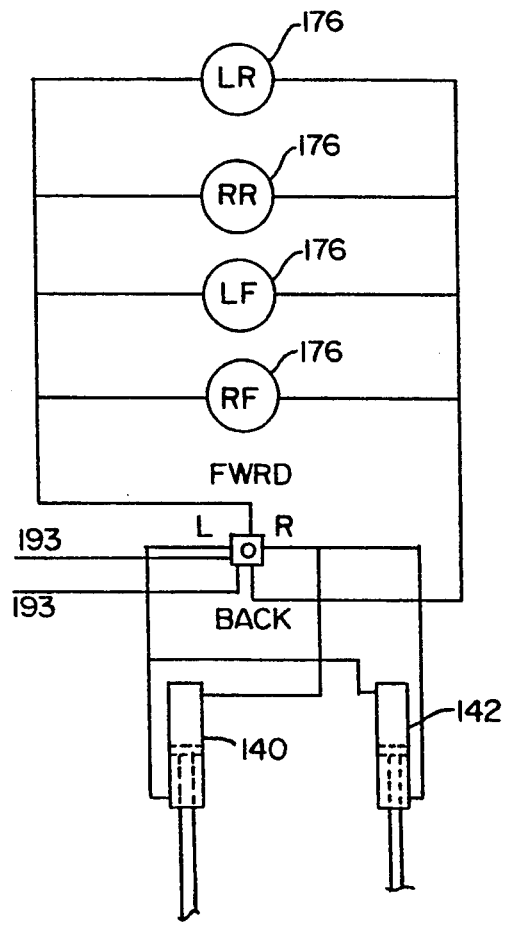
FIG. 13 is a schematic representation of a hydraulic system for propelling and steering a vehicle of the present invention.

As shown in FIG. 1, movement of the system 22 is controlled by a right-hand joy stick 190 in an operator's cab 191. A simplified schematic diagram showing the interaction of the joy stick 190 with the wheel motors 176 and steering rams 140 and 142 is shown in FIG. 13. All of the motors are connected in parallel through the main hydraulic lines 192, 193 which are in turn connected to the first main hydraulic pump 172 connected in series to the engine 171. Moving the joy stick 190 forward or backward reverses the flow of fluid from the hydraulic lines. Moving the joy stick left to right retracts or extends the left-hand hydraulic ram 140 in a direction opposite to the right-hand hydraulic ram 142. Thus, steering is achieved by operation of the hydraulic rams while the hydraulic motors on the side of the extended ram are allowed to overrevolve because they are connected in parallel with the motors on the contracted side. A conventional, momentary single pull double throw trigger switch in the right-hand joy stick operates solenoid operated pilot valves (not shown) which control the speed range of the wheel motors.

Figure 14:
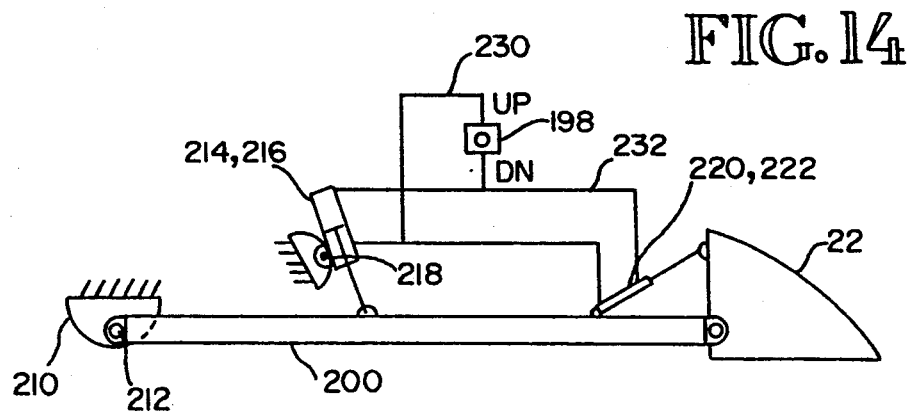
FIG. 14 is a simplified hydraulic diagram of a system for controlling the elevation and attitude of the vacuum head of the present invention.

The elevation and attitude of the vacuum head 22 are controlled with a similar hydraulic system operated by left-hand joy stick 198 in the operator's cab 191. As best seen in FIGS. 2 and 14, the vacuum head 22 is pivotally connected to an elongated frame 200. The frame is pivotally connected to the cab section 132 below a transaxle member 210 in FIG. 2 at pivot 212. Symmetrical, double-acting hydraulic rams 214 and 216 are pivotally connected to the frame midway between the vacuum head 22 and transaxle member 210, at the cab section in the vicinity of the operator at 218. Actuation of these rams controls the elevation of the vacuum head above the beach surface 26.

The attitude of the vacuum head 22 is controlled by operation of secondary, symmetrical double-acting secondary rams 220, 222. Hydraulic control lines 230, 232 coordinate the rams so that when the principal rams 214, 216 are contracting, the secondary rams 220, 222 are extending so as to maintain the vacuum head 22 in a substantially parallel relationship to the beach surface, in the conventional manner. Those of ordinary skill in the art will understand that this system can be modified to provide independent control of elevation and attitude by taking advantage of the unused roll axis of the hand controller 198. Independent control of the vacuum head attitude advantageously allows the operator 133 to dip the auger 56 into relatively deep puddles of oil for direct deposition into the oil bladders 114. A suitable control system is available form Nachi Corporation, Japan.

The hydraulic rams 214, 216, 220, 222 as well as the various hydraulic pumps (other than the hydraulic motor for the fan 68 and the radial motors 176 for driving the wheels) are all powered by an auxiliary hydraulic pump (not shown) mounted on the diesel engine 171.

A suitable auxiliary hydraulic pump is model No. 33 available from Eaton Corporation, Eden Prairie, Minn.

All structural components of the vacuum head 22 are preferably manufactured from thin gauge, Attic steel. Alternatively, the structural elements of the system 20 can be constructed of lighter grade aluminum alloys tungsten inert gas welded for light weight and to protect against spark ignition of entrained oil droplets. It is important that the system disturb the beach 26 as little as possible and therefore preferably apply a pressure of no more than 6 psi to the beach surface. To this end, the preferred tires 180, 182, 184 and 186 are high profile, low-pressure model 28L-60 tires from Goodyear, Akron, Ohio. These tires provide a ground clearance for the vehicle 24 of approximately 18 inches and suspension and shock absorption.

Substantial care has been taken to avoid the use of electrical equipment in this system wherever possible. While not illustrated, auxiliary lighting can be provided to facilitate operation at night. Preferably, all electrical switches are debounced and spark suppressed to enable the system to operate in hazardous and/or possibly explosive atmospheres.

As stated above, the transportability of this system is a significant advantage in arriving at a spill site before the volatiles in the oil have evaporated producing a difficult to handle, heavy sludge. As shown in FIG. 10, the cab section 132 can fit inside the pallet section 134 with its wheels removed when the fan 68 and oil/water separator 86 have been removed therefrom. The fan and oil/water separator, are provided with hollow, transverse feet 300 to facilitate their handling by conventional forklifts.

Figure 7:
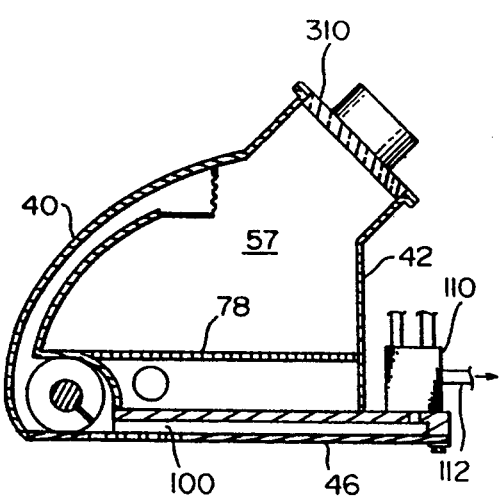
FIG. 7 is a sectional, elevational view taken along lines 7—7 of FIG. 4.
Figure 8:
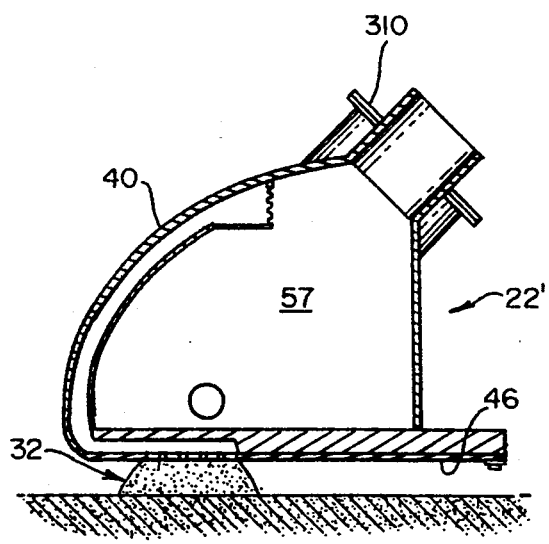
FIG. 8 is a sectional, elevational view similar to FIG. 6 of an alternate embodiment of the vacuum head.

Those of ordinary skill in the art will recognize other modifications and embodiments to the invention which fall within the scope of this disclosure. For example, the auger 56 shown in FIGS. 6 and 7 can be deleted as shown in an alternate embodiment 22' of FIG. 8 in applications where pools of oil are not expected to be encountered. In addition, when handling fluid contaminants which do not have an affinity for the auger, the non-auger embodiment 22' is preferred.

Figure 6A:
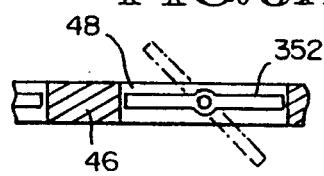
FIG. 6a is an enlarged, sectional view of circled area 6a in FIG. 6.
Figure 12:
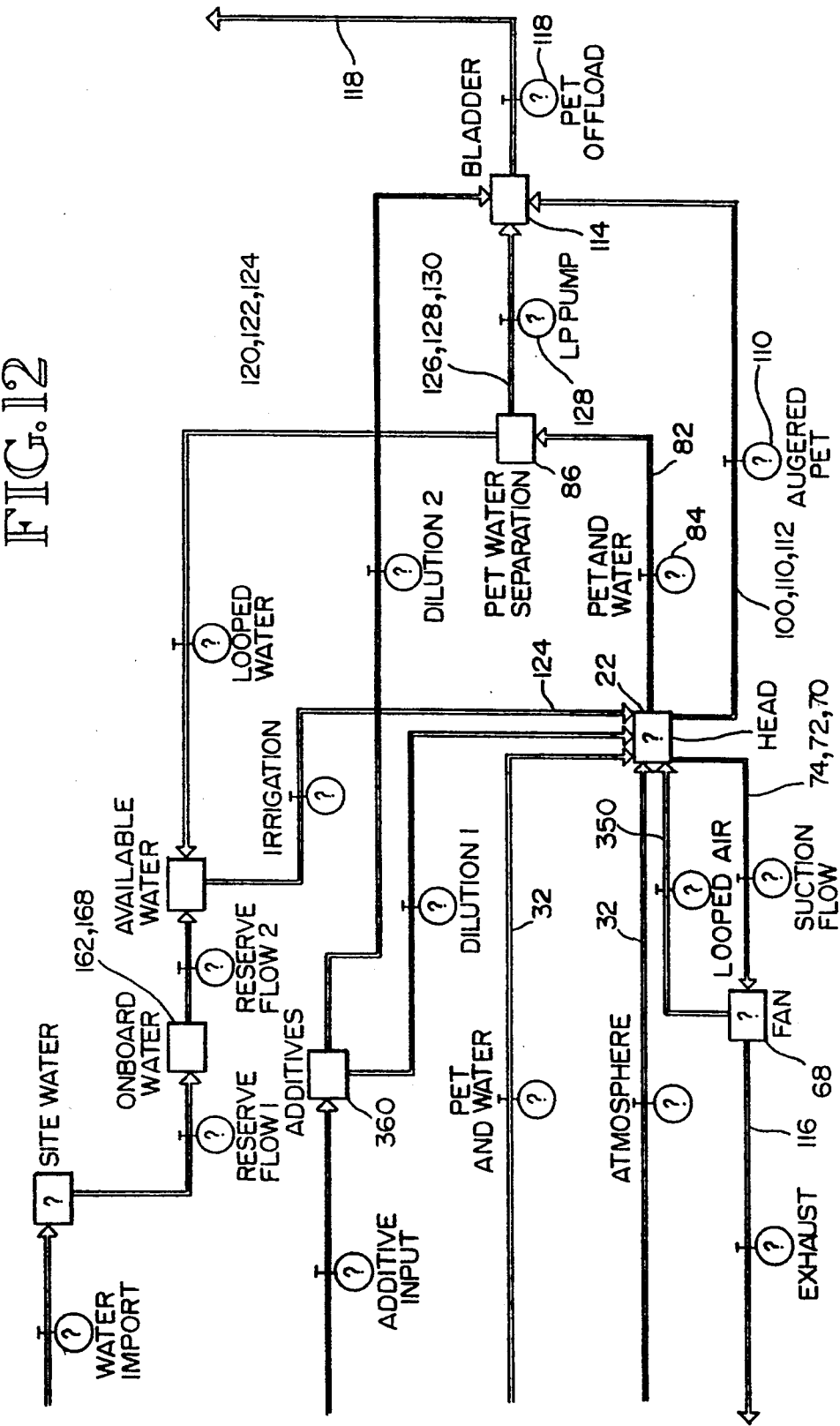
FIG. 12 is a more detailed fluid flow diagram, similar to FIG. 11 illustrating an additional embodiment of the invention.

Further modifications and variations of the invention are also contemplated. As an additional example, each of the vacuum head embodiments can be provided with a plexiglass viewing port 310 for visual monitoring of the sump 80 contents and fluid level. The sump screen 78 can be omitted in certain applications. Further yet, the fluid flow can be varied and modified from that shown in FIG. 11. As shown in FIG. 12, additional feedback loops can be provided. An air feedback loop 350 between the fan 68 and vacuum head 22 can be provided to provide an additional air flow variable other than fan speed. Also, as shown in FIG. 6a, butterfly type louvers 352 can be provided in the apertures 48 to control the pressure differentials within the vacuum head. As also shown in FIG. 12, a fluid path for additives 360 such as detergents, enzymes and emulsifiers can be provided to deliver such products to the vacuum head 22 and oil storage bladders 114.

Other embodiments and variations will still be apparent to those of ordinary skill in the art. Therefore, the invention is not to be limited by the description above, but is to be determined in scope by the claims which follow.

I claim:

1. A quick response system for recovering oil spills from particulate substrates, comprising:

a vacuum head having a substantially planar bottom surface defining an oil/air/water inlet having a first cross sectional area, the inlet being fluidly connected in series to an adjacent, upwardly directed plenum defining a second cross sectional area substantially smaller than the first cross sectional area, and, adjacent to the plenum, a precipitation chamber defining a third cross sectional area substantially larger than the second cross sectional area and having a fluid sump adjacent to a bottom thereof and an air outlet adjacent to a top thereof;

support means for supporting the vacuum head at a preferred height above a surface of a water saturated, oil contaminated substrate;

vacuum means, fluidly connected to the air outlet for generating a high velocity air flow through the vacuum head so that a frothy mixture of oil, air and water substantially devoid of solid particulates from the substrate is generated beneath the planar bottom of the vacuum head when the head is positioned at the preferred height and so that oil and water droplets are drawn into the inlet and entrained in the air flow; and fluid removal means fluidly connected to the sump for removing precipitated fluid therefrom.

2. The system of claim 1, wherein the vacuum head includes a rotatable oleophilic auger between the oil/air/water inlet and the plenum for collecting oil droplets entrained in the air flow, the vacuum head further including an oil conduit fluidly connected to an output on the auger for removing collected oil from the vacuum head.

3. The system of claim 1, wherein the first cross sectional area is approximately 450 in$^2$, the second is approximately 250 in$^2$, and the third is approximately 1600 in$^2$ so that oil and water droplets entrained in the air flow are substantially released therefrom and fall into the sump.

4. The system of claim 3, wherein the inlet is positioned adjacent to a forward edge of the vacuum head and the plenum is an elongated passage defined by a pair of upwardly curving walls having a substantially constant separation distance of approximately two inches, and the precipitation chamber is defined principally by an upper wall and a lower wall having a separation distance of approximately 20 inches.

5. The system of claim 4, wherein the vacuum means includes a fan laving a capacity of at least 10,000 ft$^3$/min so that the air flow velocity at the inlet is at least approximately 60 ft/sec, the air flow velocity in the plenum is at least approximately 150 ft/sec, and the air flow velocity in the precipitation chamber is substantially less than 60 ft/sec.

6. The system of claim 1, including an oil/water separator fluidly connected to the fluid removal means for separating the fluid into relatively pure water and relatively pure oil.

7. The system of claim 6, including an irrigation mechanism on the vacuum head and water feedback means fluidly connected to the oil/water separator for receiving the relatively pure water and transporting the same to the irrigation mechanism for irrigating the beach in the vicinity of the head.

8. The system of claim 6, including a recovered oil receptacle fluidly connected to the oil/water separator for receiving and storing the relatively pure oil recovered from the substrate.

9. The system of claim 8, wherein the support means includes a self-propelled vehicle for supporting the vacuum head, the oil/water separator, the vacuum means, and the recovered oil receptacle.

10. The system of claim 9, wherein the vehicle has a cab section which carries the vacuum head and a pallet section articulated with respect to the cab for carrying the oil/water separator, the vacuum means, and the recovered oil receptacle;

11. The system of claim 10, wherein the vehicle imposes a pressure of less than 6 psi on the substrate.

12. The system of claim 11, wherein the vehicle has a dry weight of less than approximately 12,000 lbs. two large tires connected to the cab and two large tires connected to the pallet each having a footprint of approximately 4 ft$^2$ so that the system imposes a dry pressure of no more than approximately 5 psi on the substrate.

* * * * *

UNITED STATES PATENT AND TRADEMARK OFFICE
CERTIFICATE OF CORRECTION

PATENT NO. : 5,404,613
DATED : April 11, 1995
INVENTOR(S) : Gary R. Whyte

It is certified that error appears in the above-indentified patent and that said Letters Patent is hereby corrected as shown below:

On the Title Page, Item [73] Assignee, should read as :
--Fraser Environmental Systems, Inc.--

Signed and Sealed this

Twenty-seventh Day of June, 1995

Attest:

BRUCE LEHMAN

Attesting Officer     Commissioner of Patents and Trademarks